(12) United States Patent
Crue et al.

(10) Patent No.: US 6,959,483 B2
(45) Date of Patent: Nov. 1, 2005

(54) METHOD OF MAKING A RECORDING HEAD

(75) Inventors: Billy Wayne Crue, Pittsburgh, PA (US); Michael Kevin Minor, Gibsonia, PA (US); Richard Joseph Bojko, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 32 days.

(21) Appl. No.: 10/441,575

(22) Filed: May 20, 2003

(65) Prior Publication Data

US 2003/0204952 A1 Nov. 6, 2003

Related U.S. Application Data

(62) Division of application No. 09/755,728, filed on Jan. 5, 2001, now abandoned.
(60) Provisional application No. 60/174,459, filed on Jan. 5, 2000, and provisional application No. 60/174,584, filed on Jan. 5, 2000.

(51) Int. Cl.[7] .......................... G11B 5/127; H04R 31/00
(52) U.S. Cl. ................... 29/603.13; 29/603.07; 29/603.11; 29/603.16; 29/603.18; 360/122; 360/123; 360/126; 360/317; 427/127; 427/128
(58) Field of Search .................. 29/603.07, 306.11, 29/603.13–603.16, 603.18; 360/122–126, 317; 427/127, 128

(56) References Cited

U.S. PATENT DOCUMENTS

| | | | |
|---|---|---|---|
| 4,458,279 A | | 7/1984 | Katz |
| 4,716,484 A | | 12/1987 | Kaminaka et al. |
| 4,933,209 A | * | 6/1990 | Anthony et al. ............ 427/116 |
| 5,068,959 A | | 12/1991 | Sidman |
| 5,187,860 A | | 2/1993 | Horibata et al. |
| 5,241,440 A | | 8/1993 | Ashida et al. |
| 5,621,596 A | | 4/1997 | Santini |
| 5,687,045 A | | 11/1997 | Okai et al. |
| 6,191,916 B1 | | 2/2001 | Sasaki |
| 6,204,999 B1 | * | 3/2001 | Crue et al. ................... 360/126 |
| 6,260,256 B1 | * | 7/2001 | Sasaki ...................... 29/603.01 |
| 6,304,414 B1 | | 10/2001 | Crue, Jr. et al. |
| 6,483,665 B1 | * | 11/2002 | Sasaki ........................ 360/126 |
| 6,557,242 B1 | | 5/2003 | Santini |

FOREIGN PATENT DOCUMENTS

JP   0573844 A   *   3/1993

OTHER PUBLICATIONS

"A new composite–core hybrid thin film ring head"; Dugas, M.; Judy, J.; Magnetics, IEEE Transactions on, vol.: 23, Issue:, Sep. 1987; pp.:2407–2409.*

* cited by examiner

*Primary Examiner*—A. Dexter Tugbang
*Assistant Examiner*—Paul D Kim
(74) *Attorney, Agent, or Firm*—Robert P. Lenart, Esq.; Pietragallo, Bosick & Gordon

(57) ABSTRACT

A recording head for use with magnetic recording media has an improved structure, made by a simplified manufacturing process. The electrically insulating materials within the recording head are inorganic. The insulating materials are vacuum deposited, with no need to use a hard bake process that would be required for use of organic insulators. In one embodiment, the write gap is first masked, and then the coil is deposited on the write gap. A slightly larger area is then exposed within the mask, permitting insulation to be deposited over the coil. In a second embodiment, the coil and associated insulation are deposited and then milled to have a tapered configuration. This recording head also places the writing pole on a very flat surface, thereby allowing plated or deposited films to be easily manufactured to correspond to narrow track widths.

3 Claims, 20 Drawing Sheets

METHOD OF MAKING A RECORDING HEAD

CROSS REFERENCE TO RELATED APPLICATIONS

This application is a divisional application of U.S. patent application Ser. No. 09/755,728, filed Jan. 5, 2001 now abandoned, which claims the benefit of U.S. Provisional Patent Application Ser. Nos. 60/174,459 and 60/174,584 both filed Jan. 5, 2000.

FIELD OF THE INVENTION

This invention relates to magnetic recording heads for use with magnetic recording media. More specifically, the invention relates to the structure and method of manufacturing for a coil within such a recording head.

BACKGROUND OF THE INVENTION

Recording heads for use with magnetic recording media typically include a pair of magnetically coupled poles, consisting of a main write pole and an opposing pole. The main pole may have a significantly smaller surface area on its bottom surface than the opposing pole. A coil is located adjacent to the main pole for inducing a magnetic field in the main pole. Magnetic recording media used with such recording heads typically includes a recording layer having alternating magnetically hard tracks and nonmagnetized transitions. If perpendicular recording is desired, a magnetically soft lower layer will typically be located adjacent to the recording layer, opposite the recording head.

The recording density is inversely proportional to the width of the magnetically hard recording tracks. Trackwidth is primarily determined by the width of the main write pole, which is limited by the various manufacturing processes used to produce such poles. Additionally, the efficiency of the coil structure in inducing magnetic flux within the poles affects the performance of the recording head.

Therefore, there is a need for an improved recording head having a main pole that can be manufactured to narrow widths. Additionally, there is a need for a recording head having a coil structure maximizing the efficiency of inducing magnetic flux in the poles.

SUMMARY OF THE INVENTION

The invention is a recording head for use with magnetic recording media, and an improved method of manufacturing such a head. Although not limited to such use, such a recording head is particularly useful for fixed or hard drives for computers.

Recording heads made in accordance with this invention include a read portion and a write portion. The write portion may be of either perpendicular or longitudinal configuration. A typical perpendicular recording head includes a main pole, an opposing pole magnetically coupled to the main pole, and an electrically conductive coil adjacent to the main pole. The bottom of the opposing pole will typically have a surface area greatly exceeding the surface area of the main pole's tip. Likewise, a typical longitudinal recording head includes a pair of poles, with a coil adjacent to one pole. Unlike a perpendicular recording head, a longitudinal recording head will typically use poles having bottom surfaces with substantially equal areas. In either case, electrical current flowing through the coil creates a flux through the main pole. The direction of the flux may be reversed by reversing the direction of current flow through the coil. In some preferred embodiments, the opposing pole of the perpendicular head (or the first pole of the longitudinal head) can also form one of two substantially identical shields for the read element, located between these two shields. The read element will preferably be either a GMR read element or a spin valve.

The write structure of the present recording head uses only inorganic insulators, for example, alumina, which may be vacuum deposited. The use of inorganic insulators also prevents the necessity of using a hard bake process, as would be necessary to cure an organic insulator. Such hard bake processes will degrade a typical GMR read sensor. Additionally, such processes cause expansion and contraction of the various components of the recording head, thereby possibly causing cracking due to the resulting stresses. Additionally, the present recording head places the writing pole on a very flat surface, thereby facilitating greater control of the spinning process used to deposit the photoresist for defining the main pole. Depositing such photoresist in a more controlled manner, providing a more uniform thickness of photoresist, permits the write pole to be plated or deposited in a manner dimensioned and configured to conform to submicron track widths.

A preferred method of manufacturing a recording head of the present invention begins with a read sensor deposited between a pair of shields, with the entire structure deposited on a substrate in the conventional manner. The read sensor may preferably be a GMR read element or a spin valve. After chemical-mechanical polishing the surface of the combined shield and opposing write pole, the write gap (preferably alumina) is deposited on top of this shield. Next, photoresist shielding is deposited on top of the opposing pole/shield and write gap, leaving exposed the area where the coil will be deposited. Next, the coil (preferably copper) is deposited on the write gap. If desired, the photoresist shielding may be removed at this point, and replaced with photoresist shielding defining a slightly larger opening around the coil. Insulation (preferably alumina) is then deposited on top of the coil, with the larger opening in the photoresist ensuring that all surfaces of the coil are covered. The photoresist shielding is then removed, and the main write pole is deposited on top of the insulation and write gap, with the top portion of the write pole magnetically coupled to the opposing pole/shield.

An alternative method of manufacturing the recording head also begins with chemical-mechanical polishing of the surface of the opposing write pole, which also forms one of the two shields for the read sensor. A layer of material forming the insulation is deposited on this surface, followed by the material forming the coil, which is in turn followed by material forming the opposite layer of insulation. Photoresist shielding is then applied to the second layer of insulation, over that portion of the insulation and coil which will remain part of the final recording head. The undesired portions of the coil and insulation material are then ion milled away, with the ion milling conducted at an angle so that the remaining portion is tapered, with the widest portion adjacent to the opposing pole. The photoresist shielding is then removed, and the write gap is deposited on top of the second layer of insulation, coil, and shield/opposing write pole. The main write pole is then deposited on top of the write gap, and magnetically coupled to the top of the opposing write pole/shield.

A typical magnetic recording medium includes a first layer having a plurality of magnetically permeable tracks separated by nonmagnetized transitions. The tracks are further subdivided into sectors. If perpendicular recording is desired, the magnetic recording medium will include a magnetically permeable lower level. The lower level is magnetically soft relative to the tracks.

The recording head is separated from the magnetic recording medium by a distance known as the flying height. The magnetic recording medium is moved past the recording head so that the recording head follows the tracks of the magnetic recording medium, with the main pole oriented parallel to the tracks and perpendicular to the trackwidth. Current is passed through the coil to create magnetic flux within the main pole. The flux will cause the magnetic fields in the tracks to align with the magnetic flux of the main pole (in the case of perpendicular recording) or the write gap (in the case of longitudinal recording). Changing the direction of electric current changes the direction of the flux created by the recording head and therefore the magnetic fields within the magnetic recording medium. A binary "zero" is recorded by maintaining a constant direction of magnetic flux through the main pole, and a binary "one" is recorded by changing the direction of magnetic flux through the main pole.

It is therefore an aspect of the present invention to provide a recording head wherein all insulating materials are inorganic.

It is another aspect of the present invention to avoid the necessity of using a hard bake process in manufacturing a recording head.

It is another aspect of the present invention to provide a recording head wherein the read element is protected from damage caused by heat during manufacturing.

It is another aspect of the present invention to provide a recording head free from thermally induced stresses.

It is a further aspect of the present invention to provide a recording head with a coil having an efficient flux path.

It is another aspect of the present invention to provide a recording head wherein the surface upon which the main write pole is deposited is kept flat, thereby permitting uniform deposition of narrower write poles.

These and other aspects of the present invention will become more apparent through the following description and drawings.

BRIEF DESCRIPTION OF THE DRAWINGS

Like reference numbers denote like elements throughout the drawings.

DETAILED DESCRIPTION OF THE PREFERRED EMBODIMENTS

The preferred embodiments of the present invention are recording heads for use with magnetic recording media, which may be configured for longitudinal or perpendicular recording. Although not limited to such use, such a recording head is particularly useful for fixed or hard drives for computers. As used herein, recording head is defined as a head adapted for read and/or write operations, although the present invention is specifically directed towards the write portion of the recording head.

Figure 1:
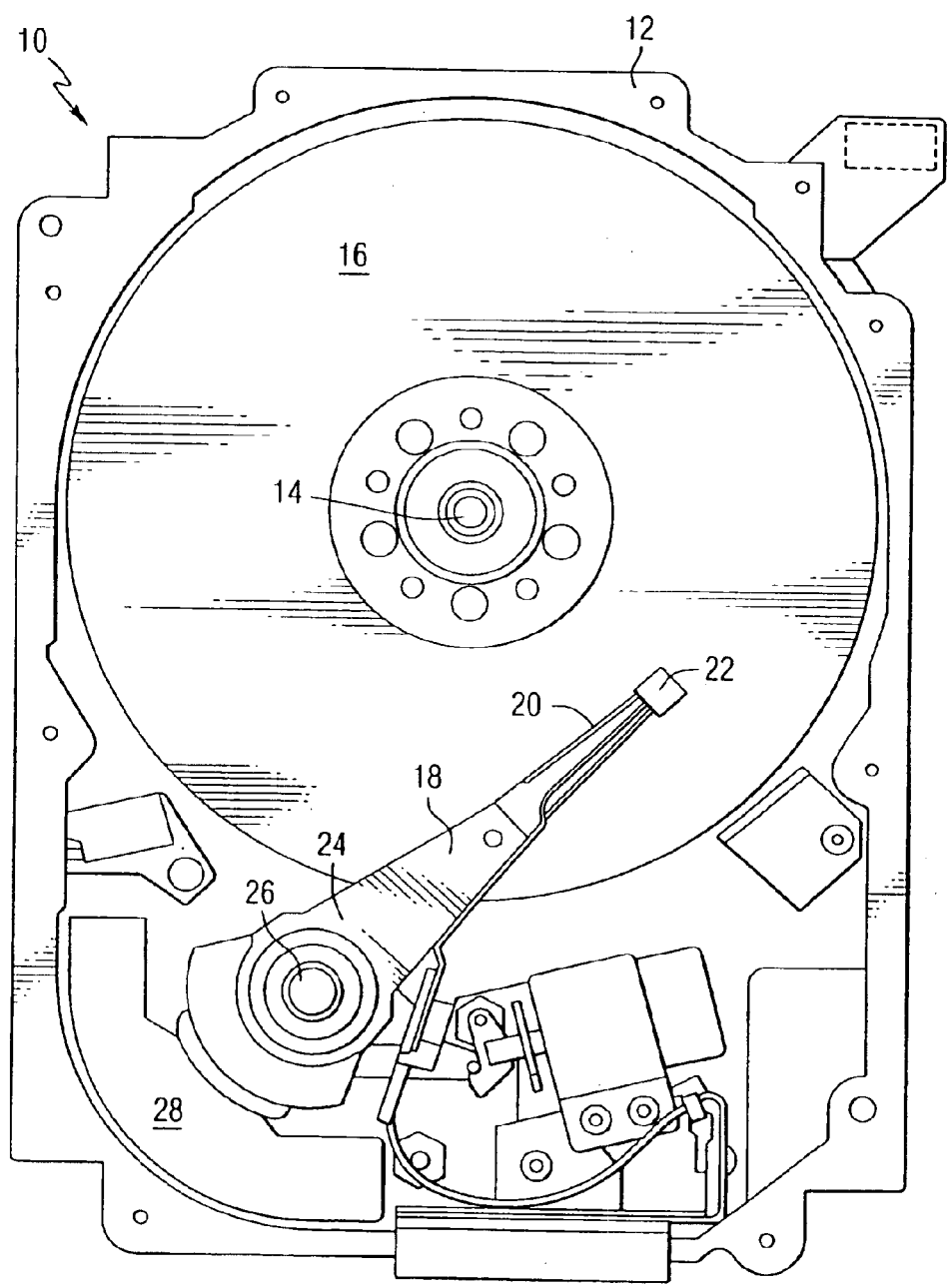
FIG. 1 is a top view of a typical hard disc drive for a computer for which the present invention may be used, illustrating the disc drive with its upper housing portion removed.
Figure 2:
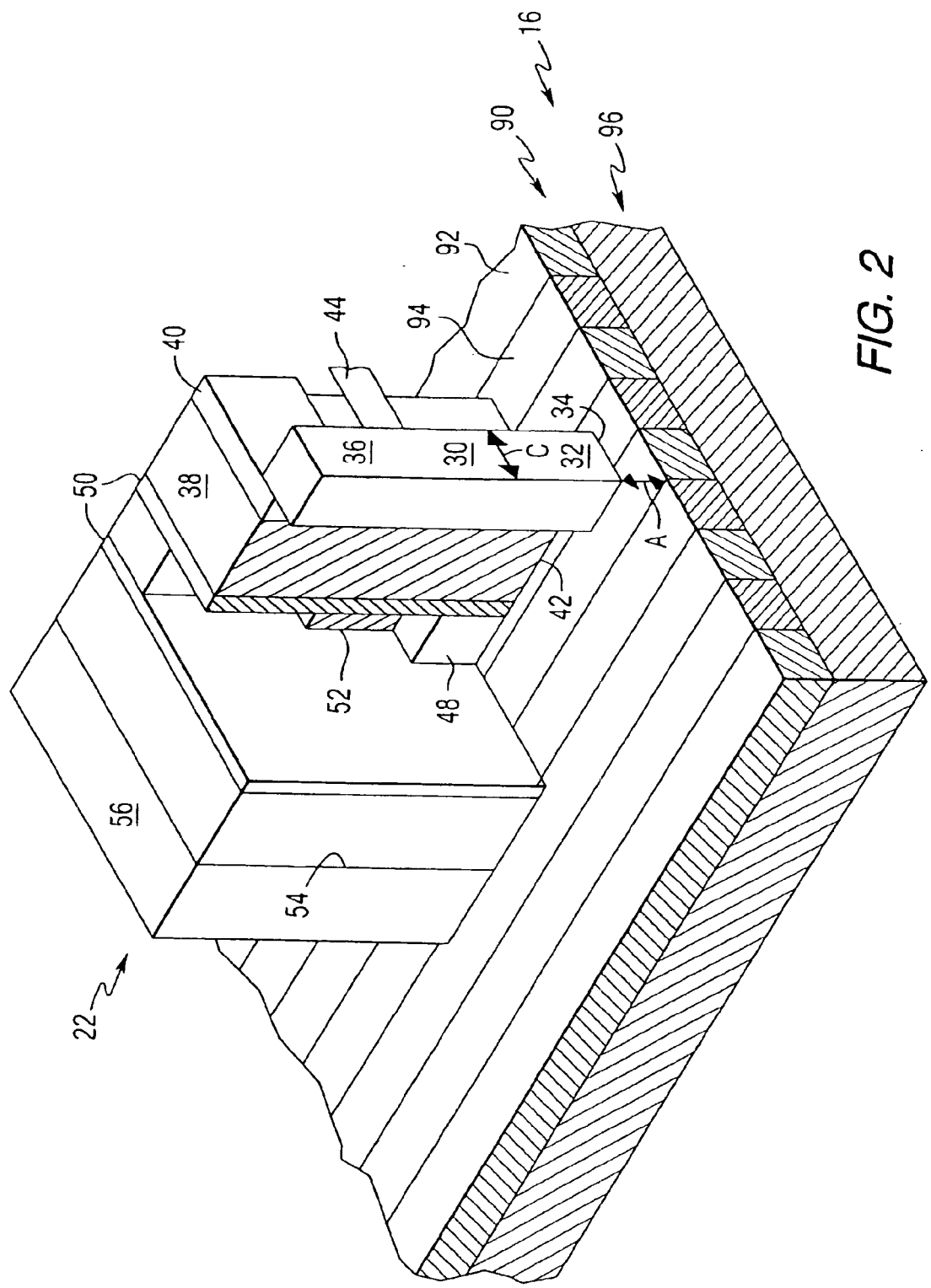
FIG. 2 is a partially sectioned, partially schematic, isometric view of an embodiment of a recording head according to the present invention.
Figure 3:
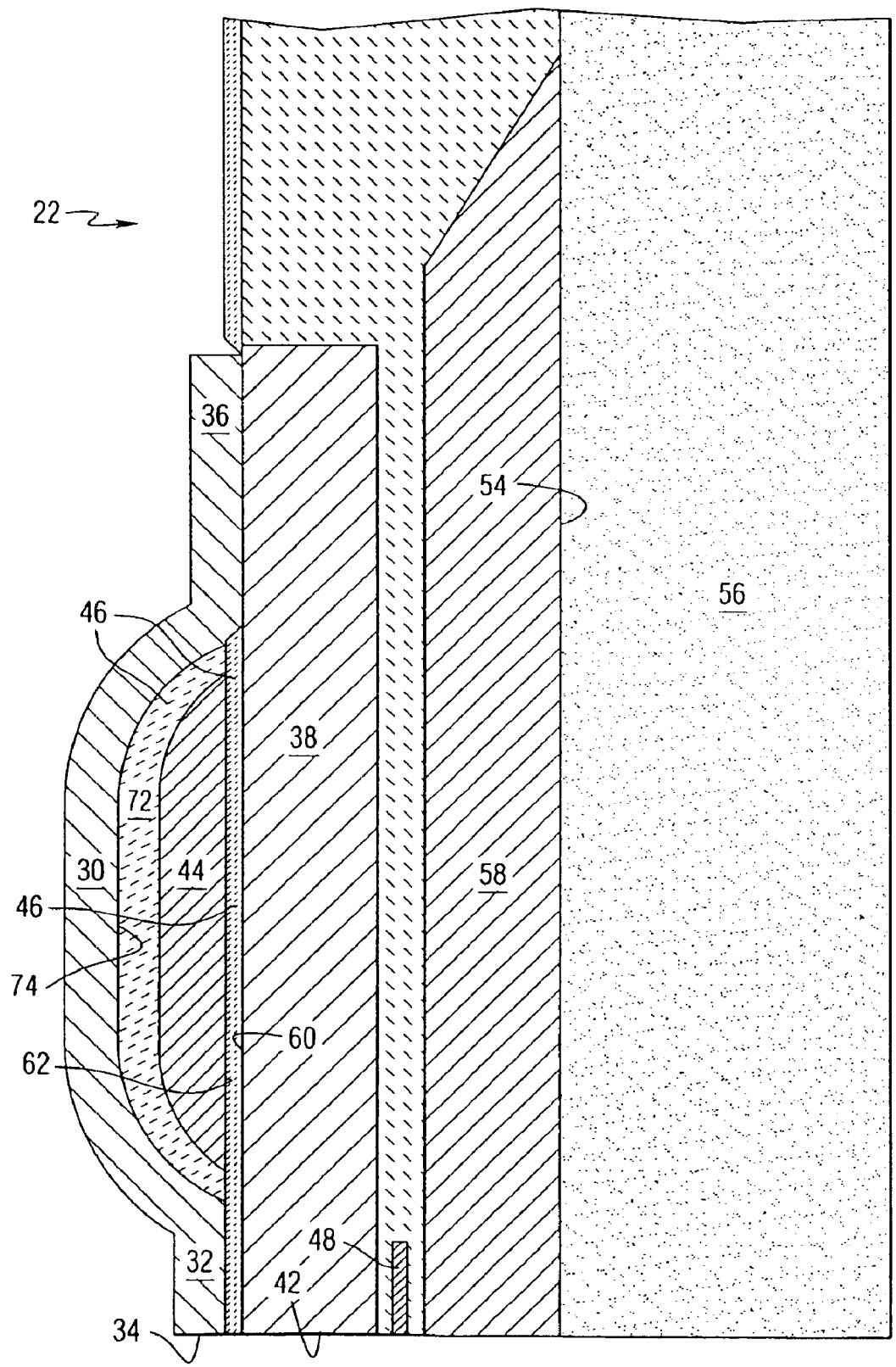
FIG. 3 is a cross-sectional side view of a recording head according to the present invention.
Figure 4:
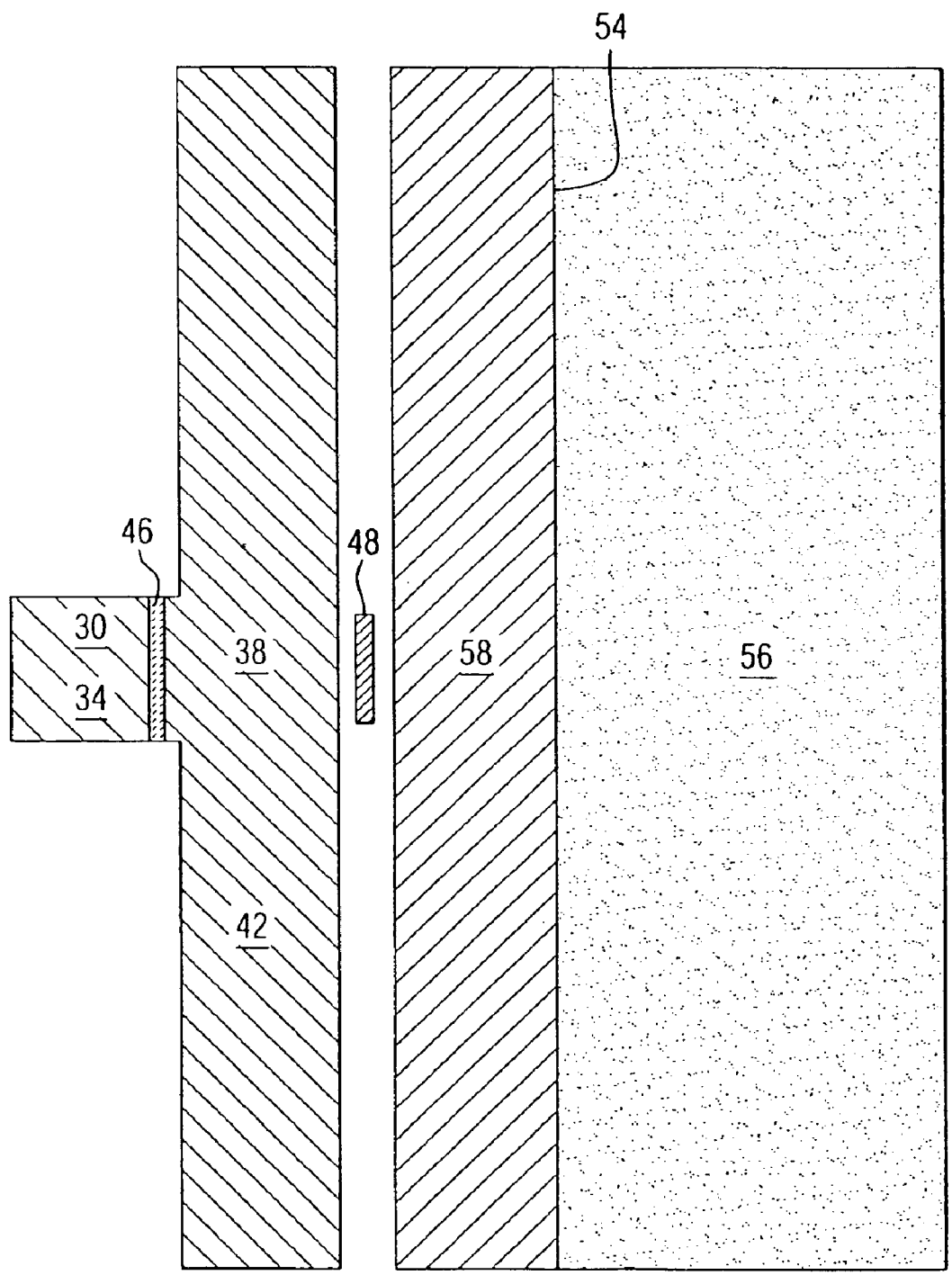
FIG. 4 is a bottom view of a recording head according to the present invention.

The invention will most commonly be used within a fixed disc drive 10 for computers, one of which is illustrated in FIG. 1. The fixed disc drive 10 includes a housing 12 (with the upper portion removed and the lower portion visible in this view for maximum clarity) dimensioned and configured to contain and locate the various components of the disc drive 10. The disc drive 10 includes a spindle motor 14 for rotating at least one magnetic storage medium 16 within the housing, in this case a magnetic disc. At least one arm 18 is contained within the housing 12, with each arm 18 having a first end 20 with a recording head or slider 22, and a second end 24 pivotally mounted to a bearing 26. An actuator motor 28, such as a movable coil DC motor, is located at the arm's second end 24, pivoting the arm 18 to position the head 22 over a desired sector of the disc 16. The actuator motor 28 is regulated by a controller which is not shown and which is well known.

Referring to FIGS. 2, 3, 4, and 14, the features of the recording head 22 are illustrated. The recording head 22 includes means for concentrating magnetic flux onto a small surface area of the magnetic recording media, here a magnetically permeable main pole 30, oriented substantially perpendicular to the magnetic recording medium 16, and having a tip 32. The tip 32 includes a bottom surface 34. The top 36 of the main pole 30 is preferably magnetically coupled to an opposing pole 38, possibly through a joint 40. The opposing pole 38 includes a bottom surface 42. If perpendicular recording is desired, then the bottom surface 42 will have a surface area significantly larger than the surface area of the bottom surface 34 of the main pole 30. If longitudinal recording is desired, then the bottom surfaces 34 and 42 may have substantially identical areas. An electrically conductive coil 44 is located adjacent to the main pole 30, and is dimensioned and configured to induce a magnetic flux in the main pole 30. The coil 44 is surrounded by insulation 46, which in the present invention is made from inorganic material. A preferred and suggested material for the insulation 46 is alumina.

Located adjacent to opposing pole 38, opposite the main pole 30 and coil 44, is a read element 48. The read element 48 is preferably a GMR read element or spin valve, operating in conjunction with electrical contacts 50 located on opposing sides of the read element 48. If the read element 48 is a GMR read element, a permanent magnet 52 may be located above the read element 48. The read element 48 is located between a pair of opposing shields. In some preferred embodiments, the opposing pole 38 may form one of the two magnetic shields. The other shield 58 is located on the opposite side of the read element 48. The entire recording head 22 is built up on a surface 54 of a substrate 56.

Figure 5:
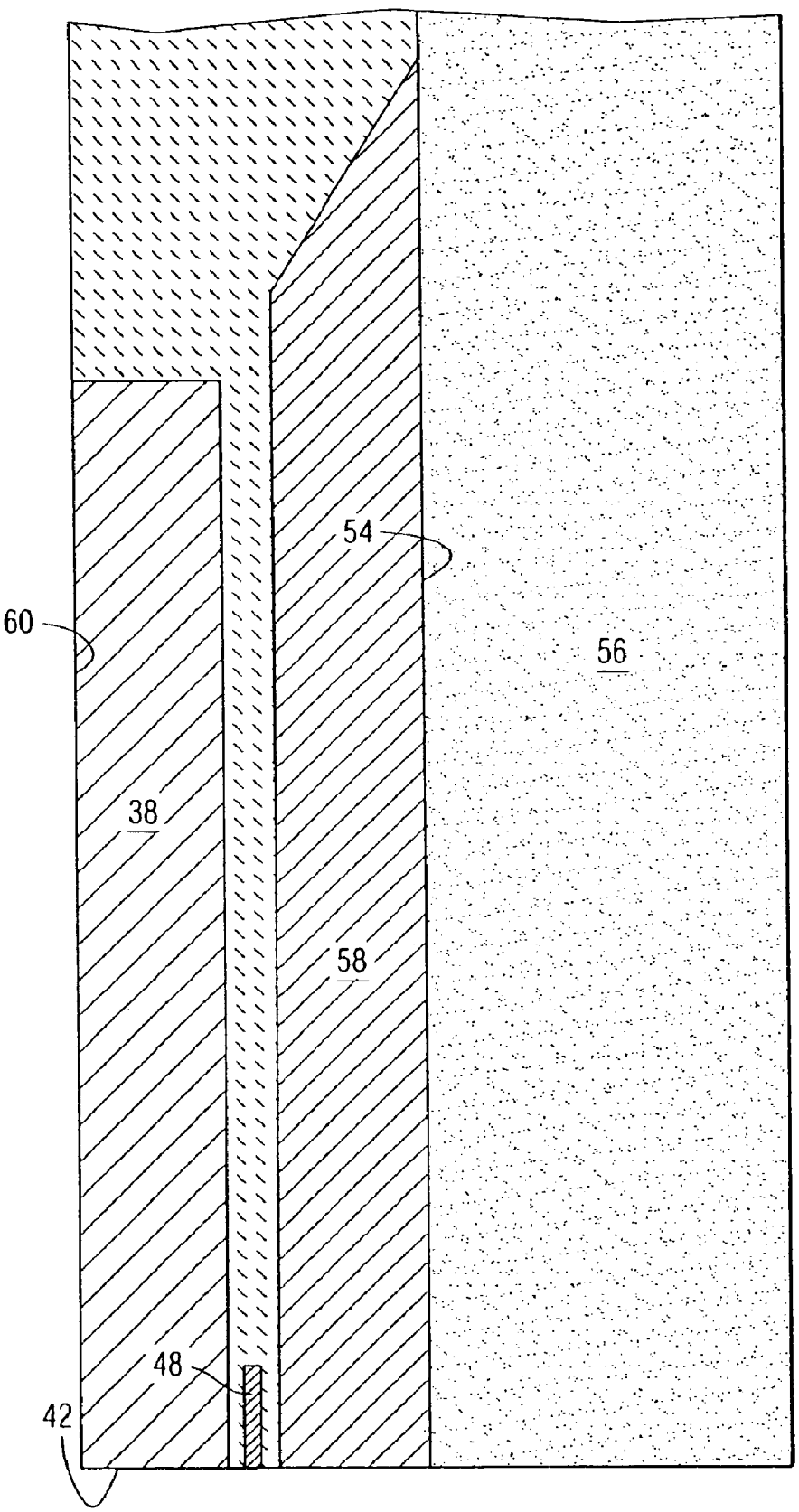
FIG. 5 is a cross-sectional side view of a substrate, shields and read element for a recording head according to the present invention.
Figure 6:
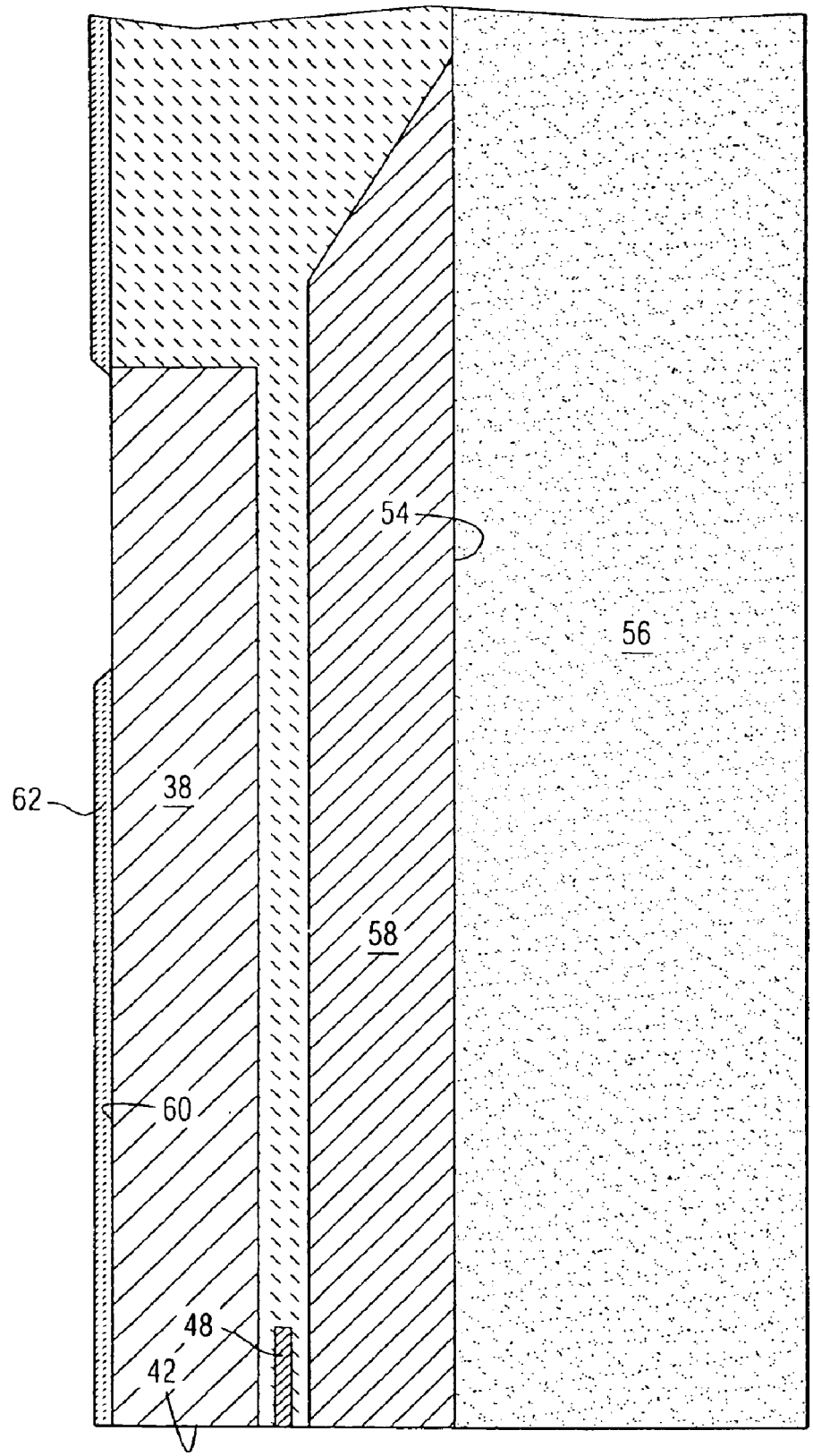
FIG. 6 is a cross-sectional side view of a substrate, shields, read elements and write gap for a recording head according to the present invention.
Figure 7:
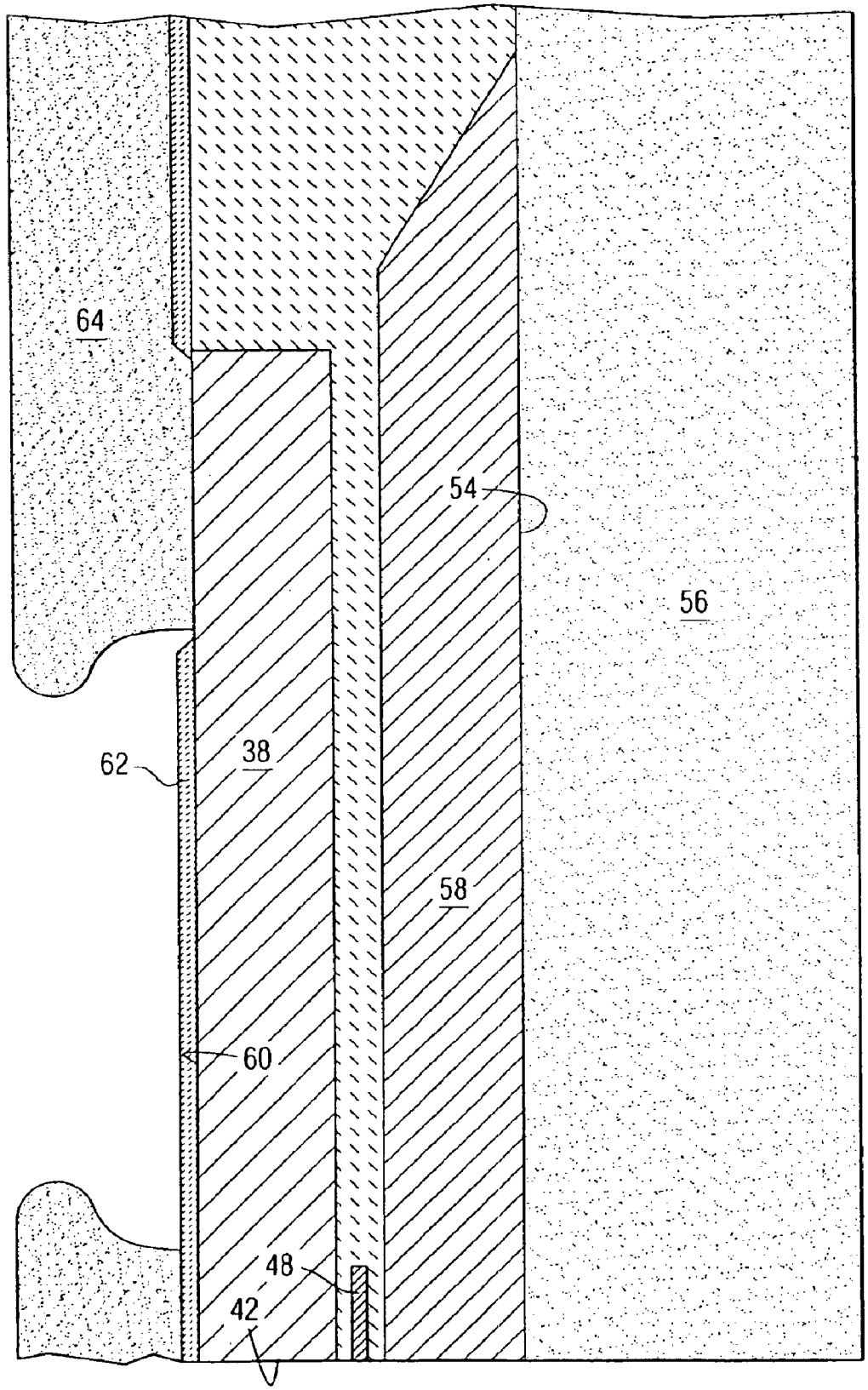
FIG. 7 is a cross-sectional side view of a substrate, shields, read element, and write gap for a recording head according to the present invention, after application of photoresist.
Figure 8:
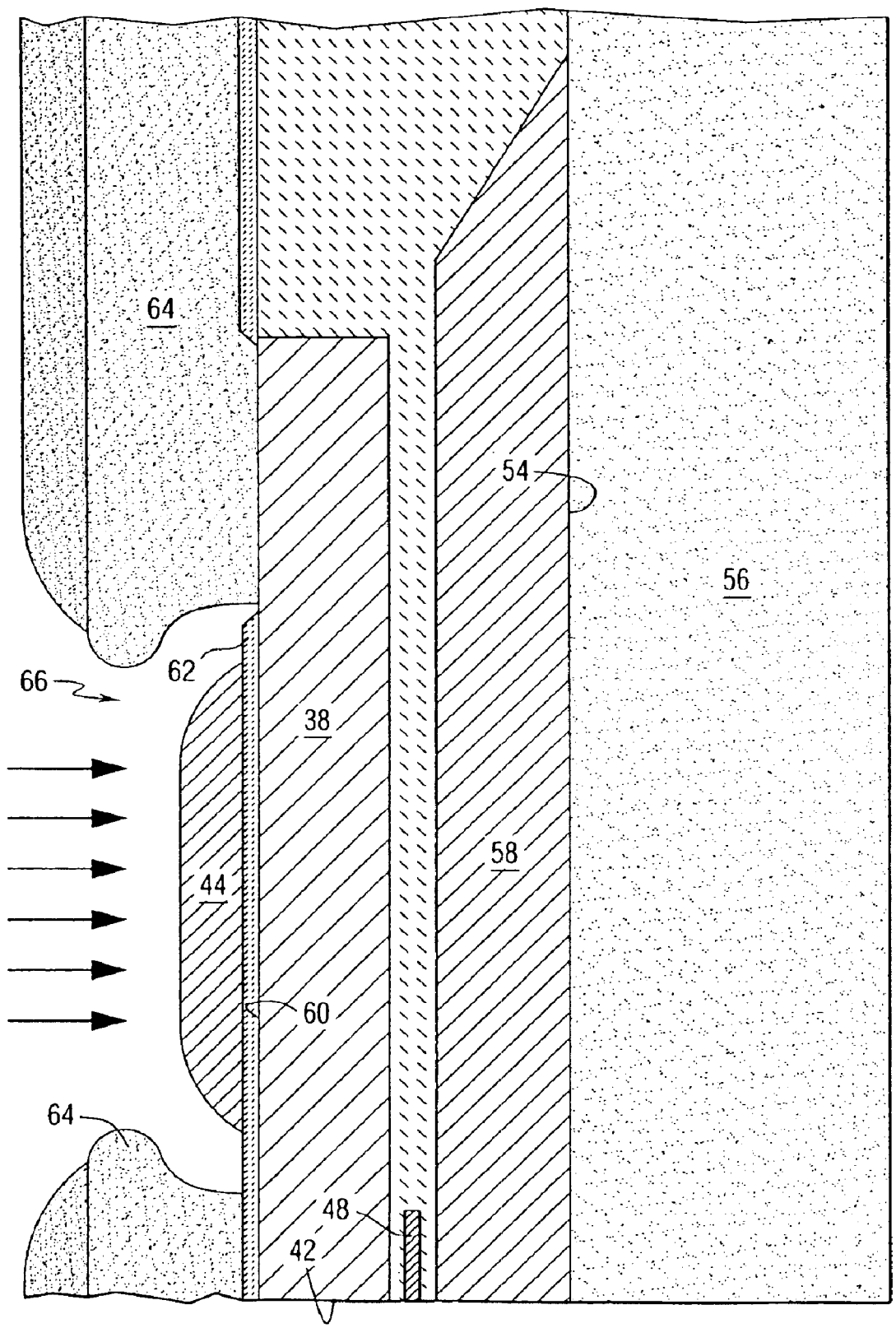
FIG. 8 is a cross-sectional side view of a substrate, shields, read elements, write gap, and deposited coil material for a recording head according to the present invention.
Figure 9:
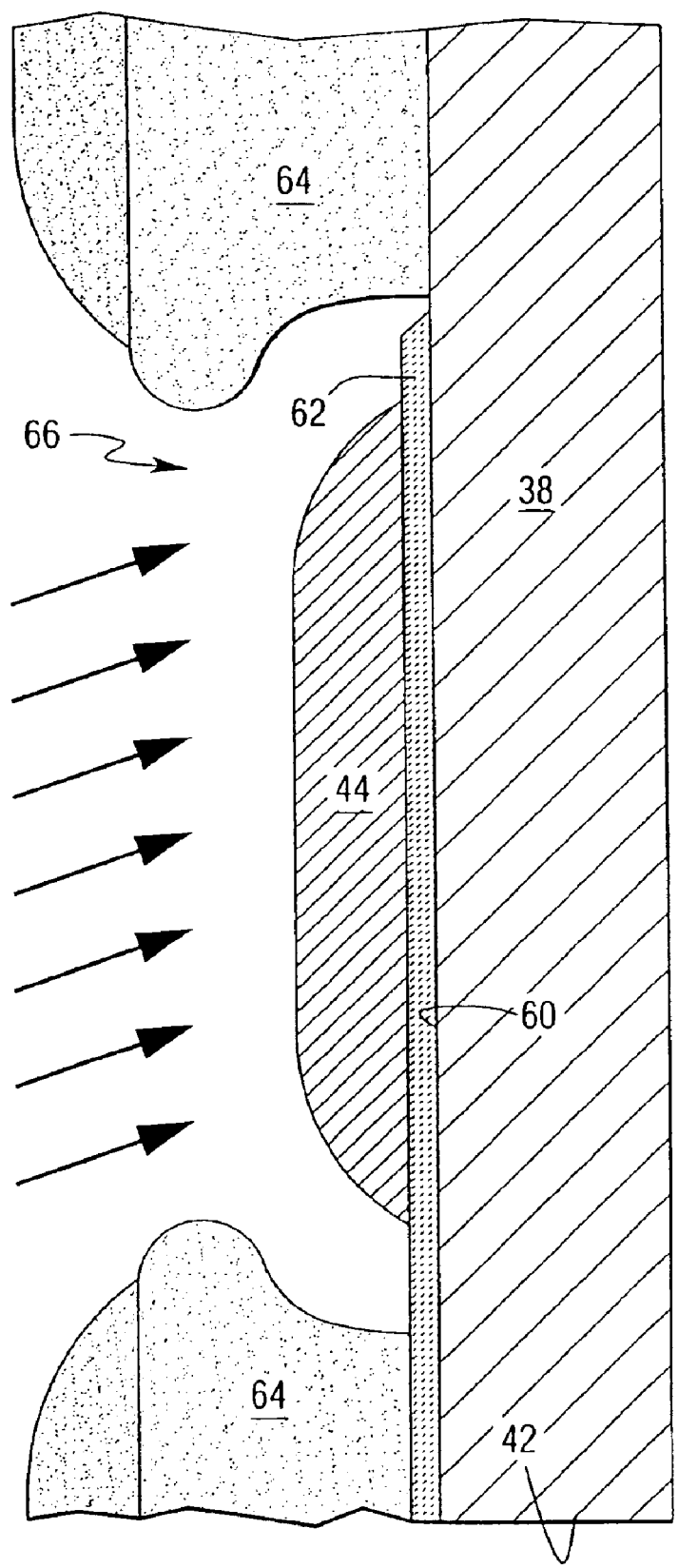
FIG. 9 is a cross-sectional side view of a shields, write gap, and deposited coil material for a recording head according to the present invention.
Figure 10:
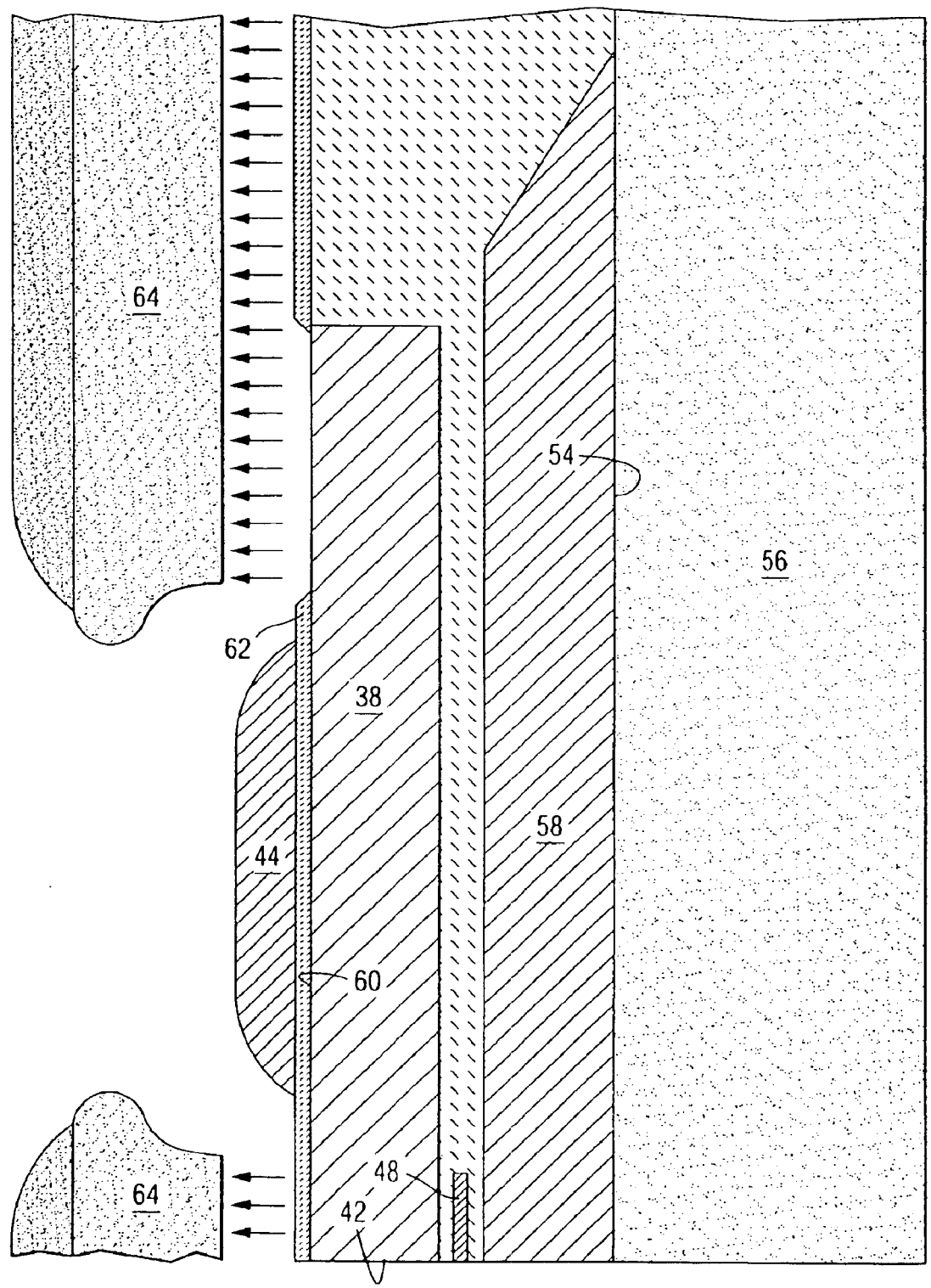
FIG. 10 is a cross-sectional side view of a substrate, shields, read elements, write gap, and coil of a recording head of the present invention, after removal of photoresist shielding.
Figure 11:
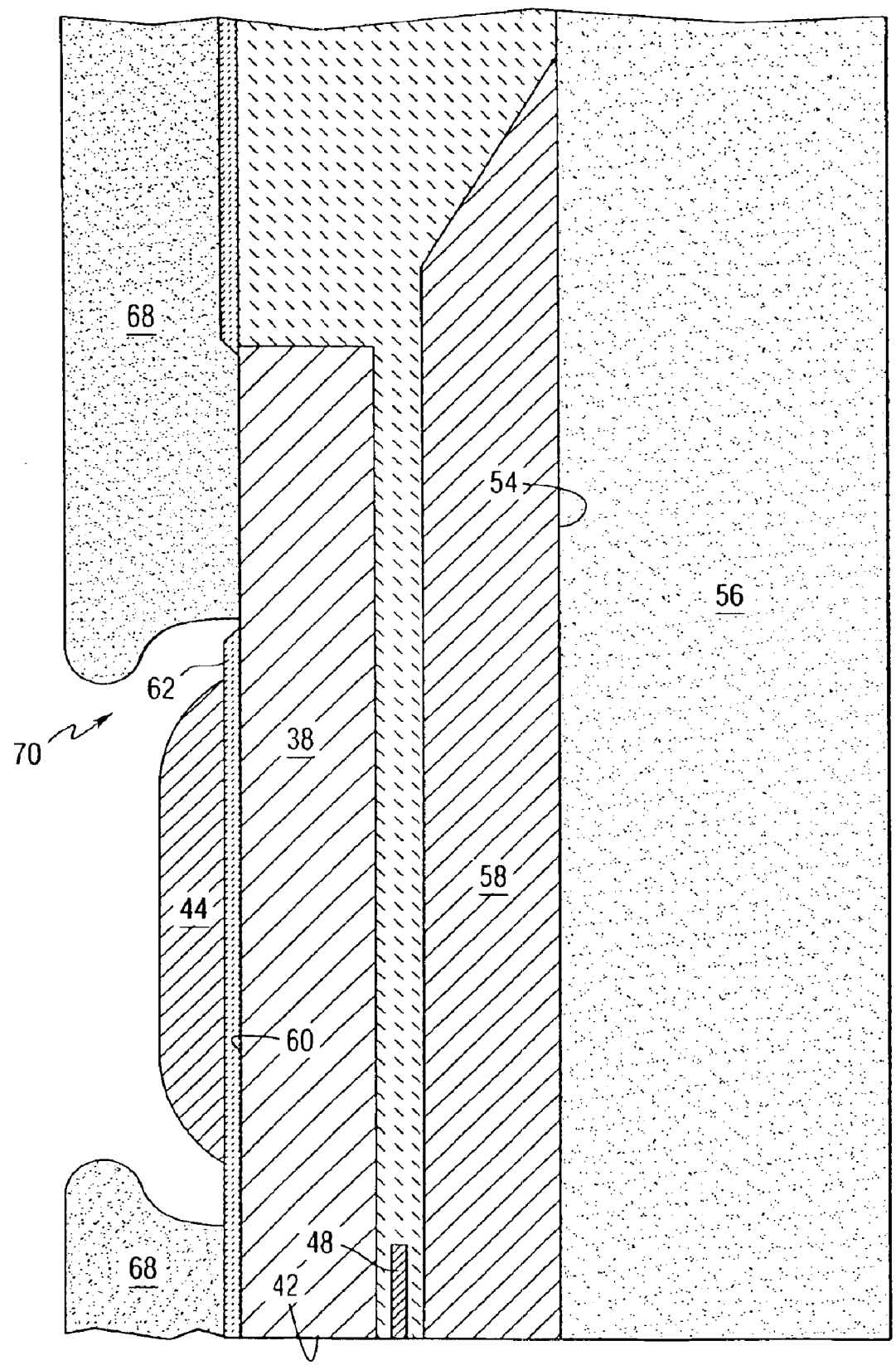
FIG. 11 is a cross-sectional side view of a substrate, shields, read element, write gap, and coil of a recording head of the present invention, after application of photoresist shielding.
Figure 12:
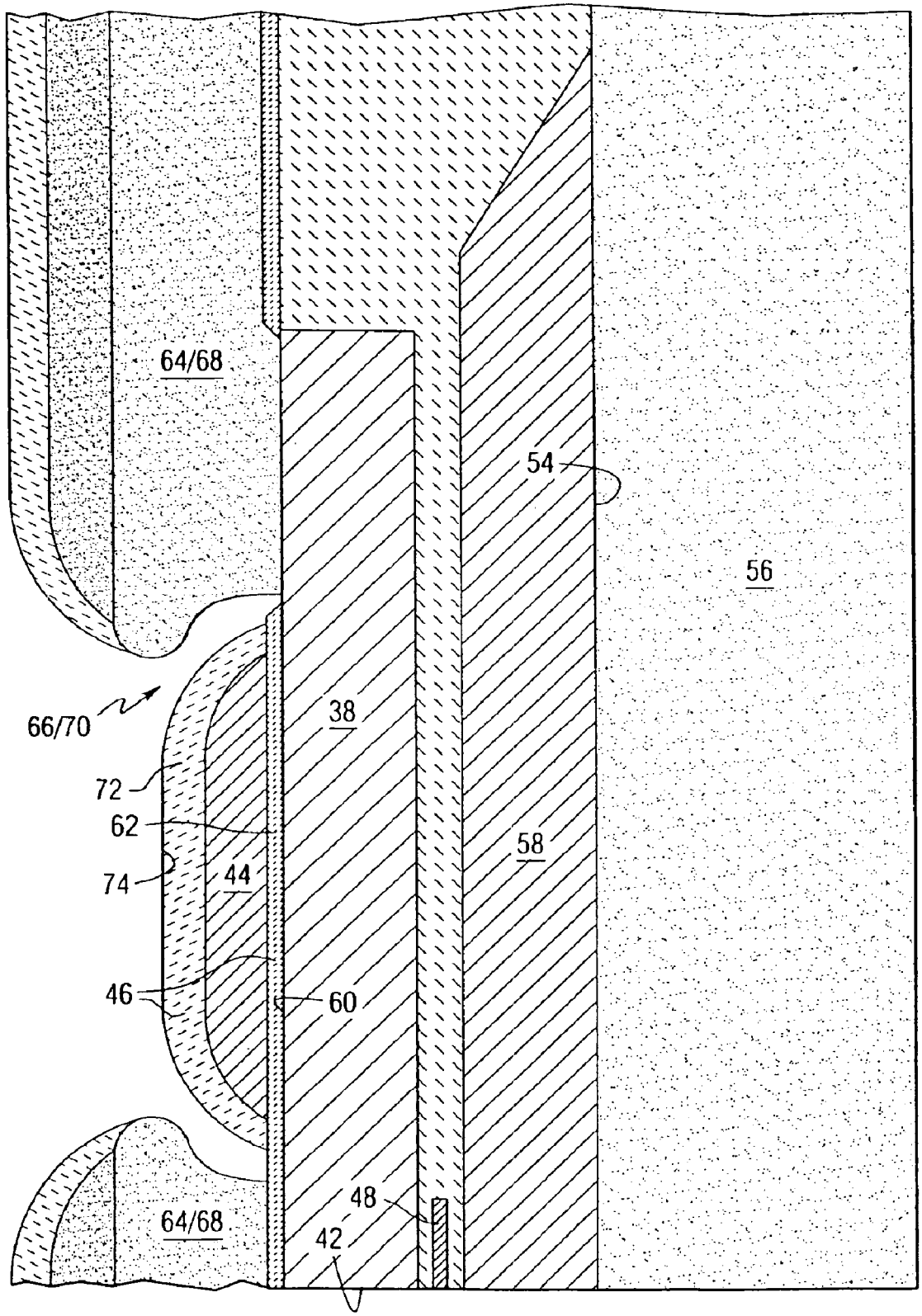
FIG. 12 is a cross-sectional side view of a substrate, shields, read sensor, coil, and deposited insulation material for a recording head according to the present invention.
Figure 13:
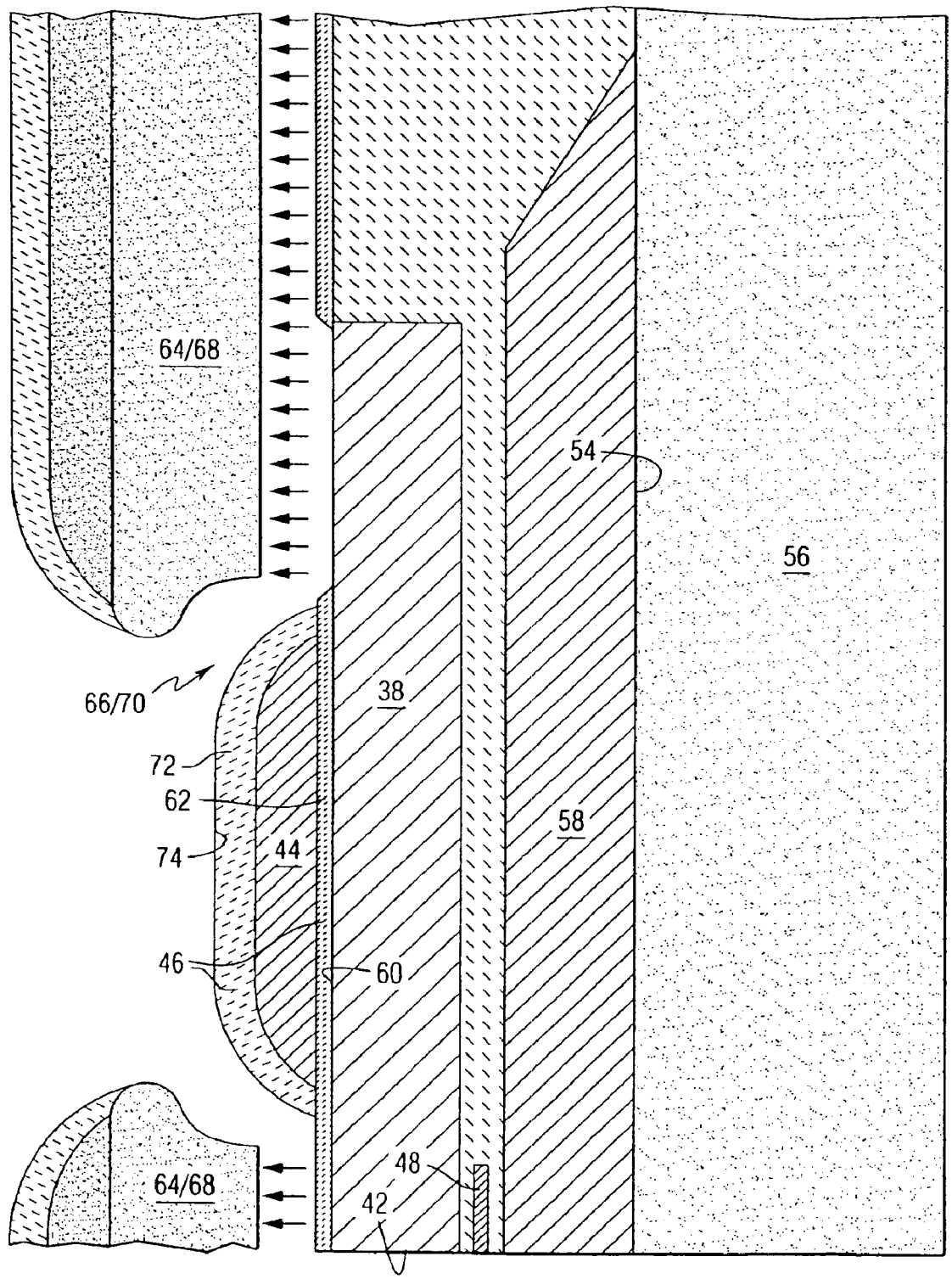
FIG. 13 is a cross-sectional side view of a substrate, shields, read element, write gap, coil and insulation for a recording head according to the present invention, after removal of the photoresist shielding.
Figure 14:
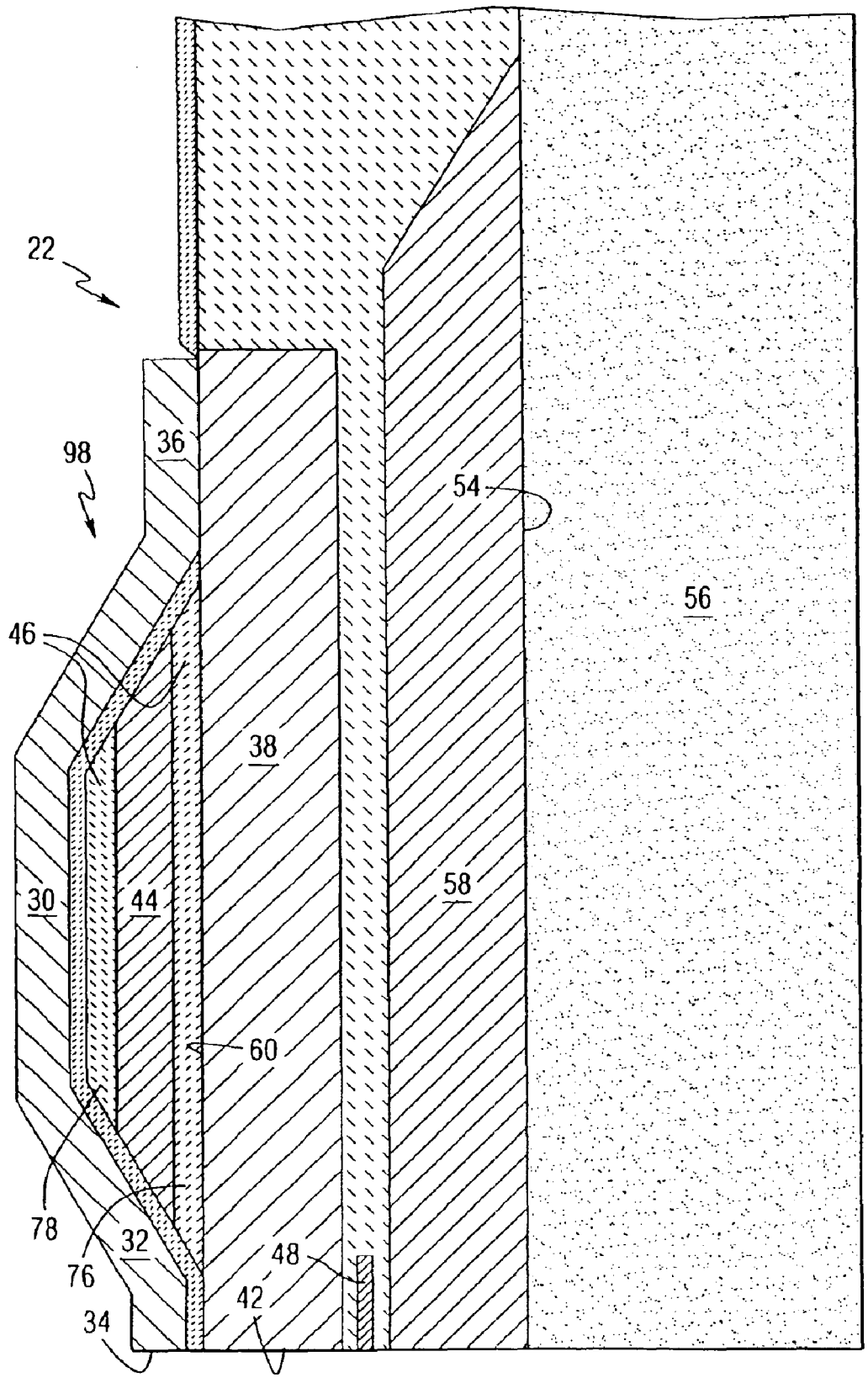
FIG. 14 is a cross-sectional side view of an alternative embodiment of a recording head according to the present invention.

One alternative method of making a recording head according to the present invention is illustrated in FIGS. 5–13. As illustrated in FIG. 5, the method begins by providing a substrate 56 upon which the read element 48 and its associated shields 38 and 58 have already been deposited. The surface 60 of shield/pole 38 is chemical-mechanical polished to ensure that it is flat. The write gap 62, which forms a part of the insulation 46, is deposited on the surface 60 of pole 38. A preferred material for the write gap is alumina. A first photoresist shield 64 is applied over the write gap 62, as illustrated in FIG. 7, thereby defining the eventual size and location of the coil 44. The material forming the coil, preferably copper, is deposited as illustrated in FIGS. 8 and 9. This material may be deposited either perpendicular to the write gap 62, or at an angle to the write gap 62, to produce an appropriately dimensioned and configured coil 44 within the gap 66 defined by the photoresist 64. At this point, the first photoresist 64 may be removed as illustrated in FIG. 10, for replacement with a second photoresist shield 68 defining an opening 70 larger than the opening 66 in the first photoresist 64 (FIG. 11), or the original photoresist 64 may simply be left in place. Referring to FIG. 12, a layer of insulation material 72 is deposited over the coil 44 and photoresist 64 or 68. The photoresist 64 or 68 is removed as illustrated in FIG. 13. The use of these deposition procedures has now defined a surface 74 having a very flat surface area. Referring back to FIG. 3, the write pole 30 is deposited on top of the surface 74. The flat surface 74 permits the photoresist that will ultimately define the width of the write pole 30 to be spinned into place in a more controlled manner, thereby permitting a small write pole to be produced without compromising the pole's magnetic properties.

Figure 15:
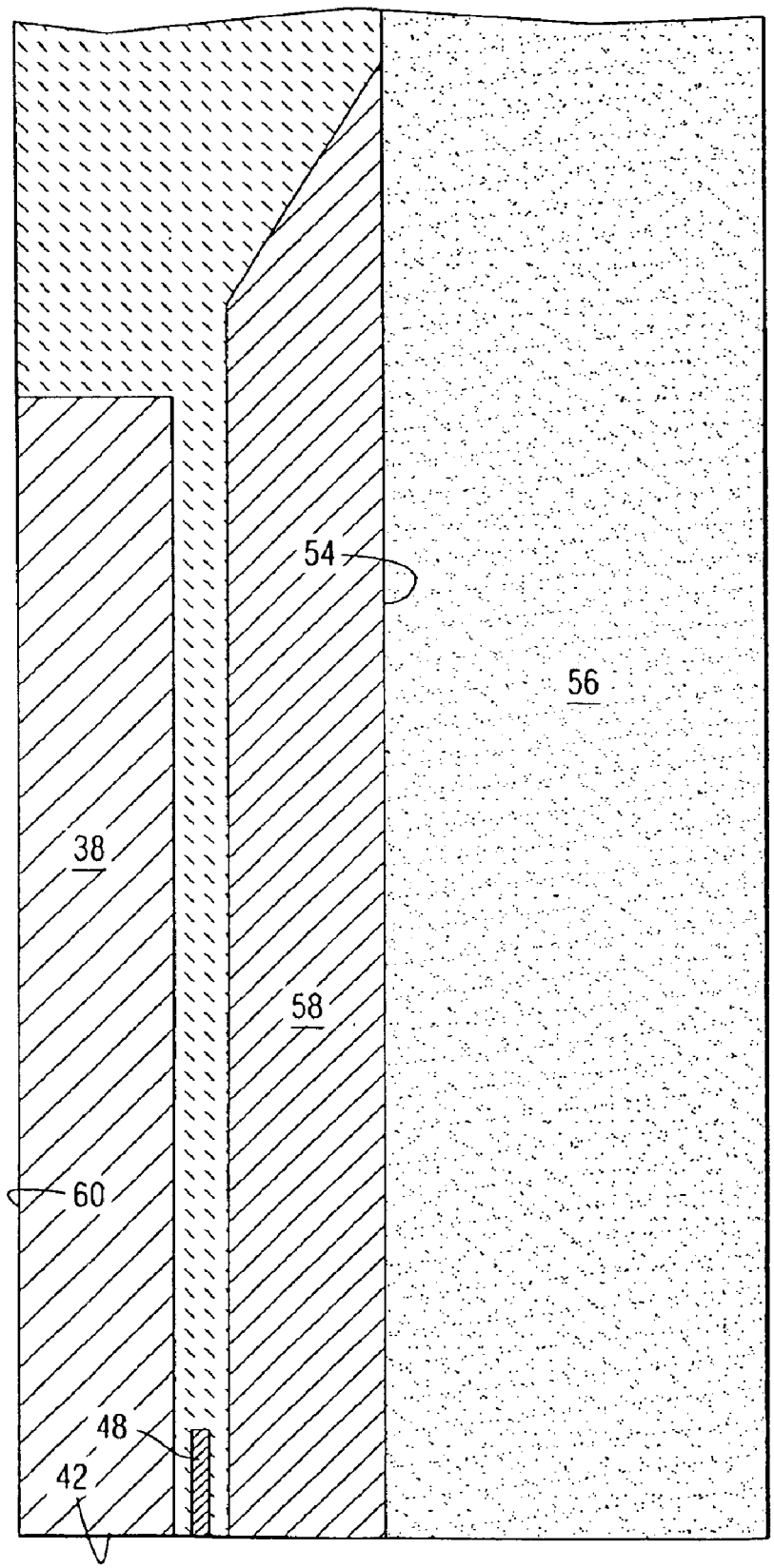
FIG. 15 is a cross-sectional side view of a substrate, shields, and read element for an alternative recording head according to the present invention.
Figure 16:
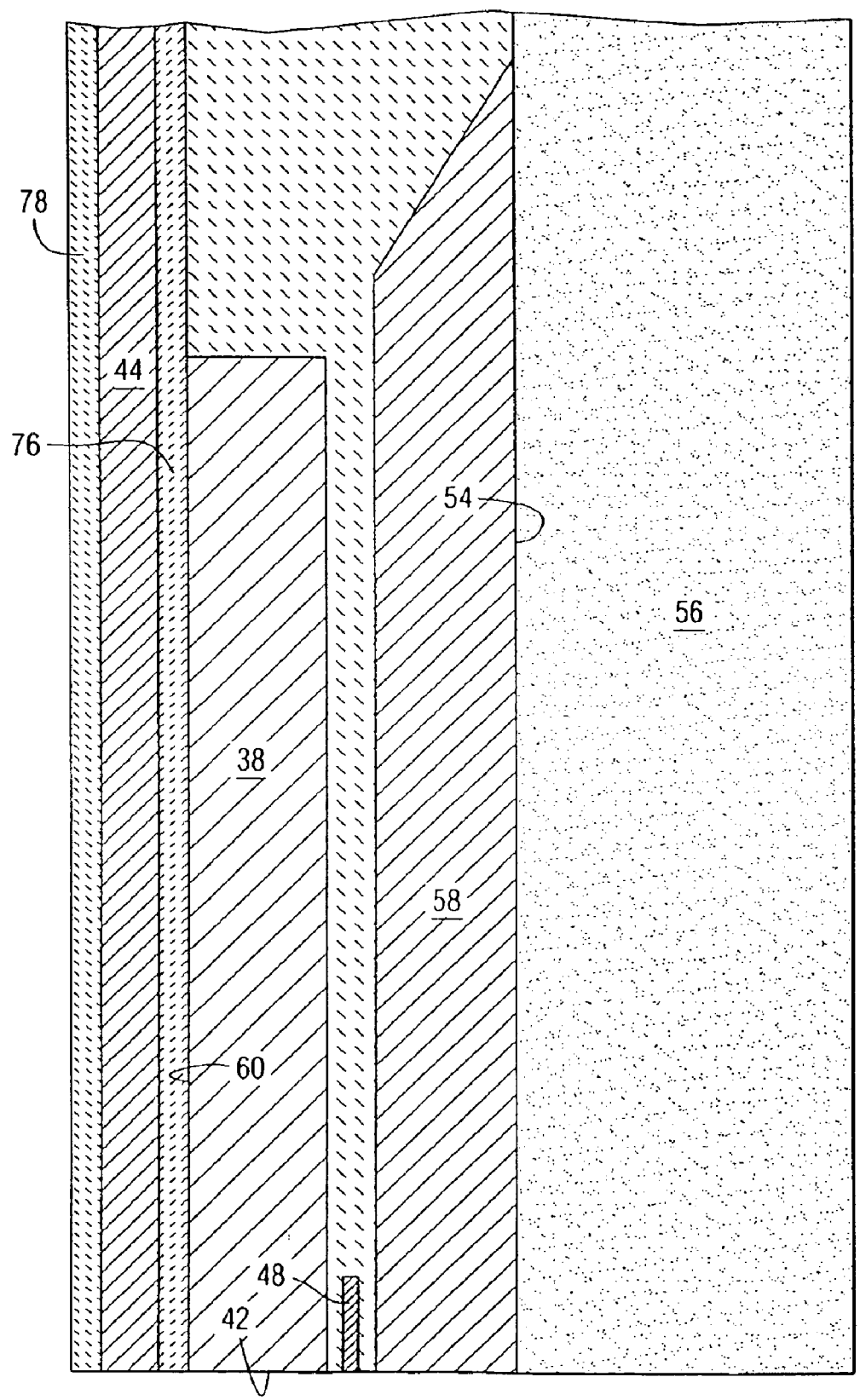
FIG. 16 is a cross-sectional side view of a substrate, shields, read element, coil, and coil insulation for an alternative recording head according to the present invention.
Figure 17:
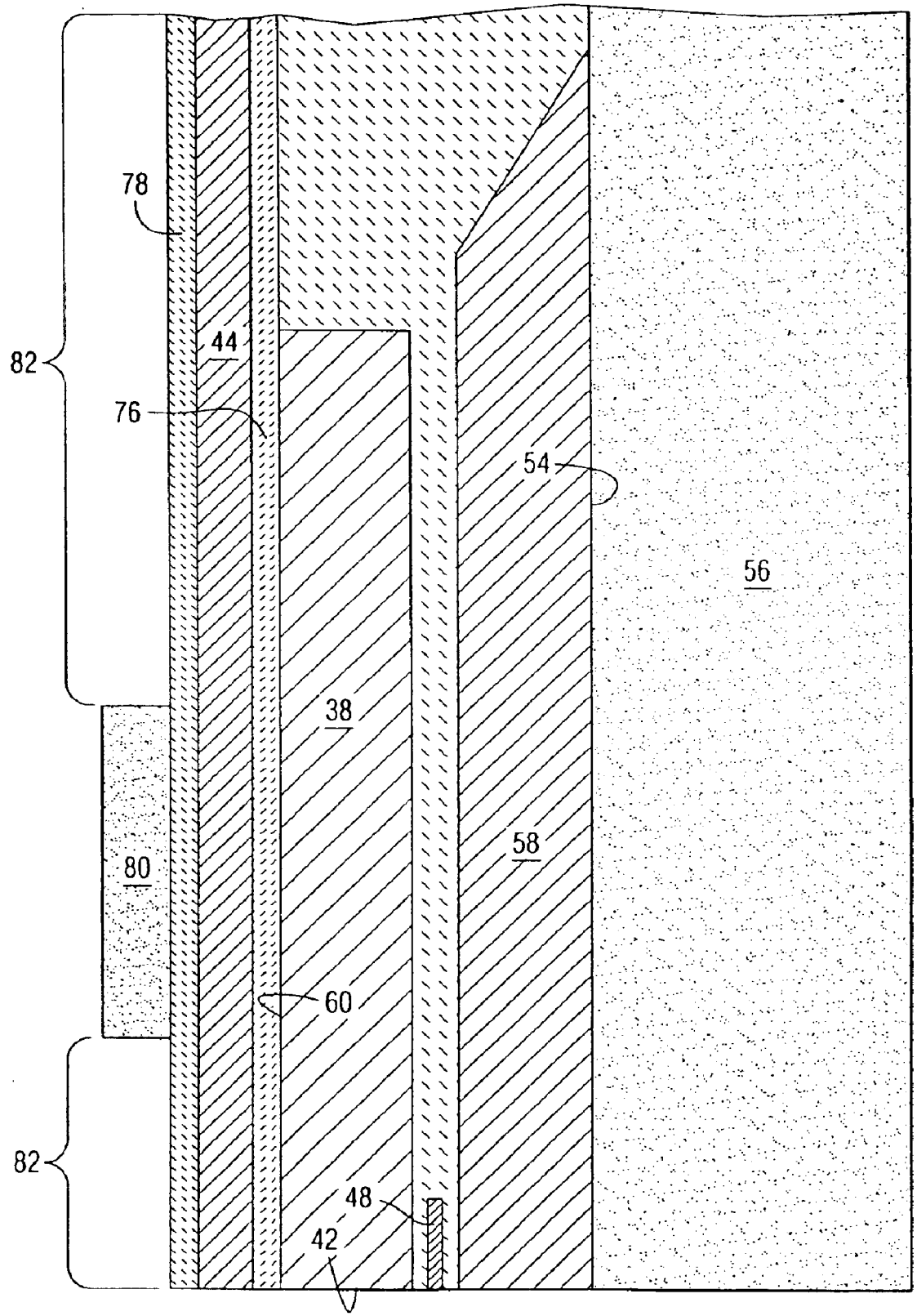
FIG. 17 is a cross-sectional side view of a substrate, shields, read element, coil and coil insulation for an alternative recording head according to the present invention, after application of photoresist shielding.
Figure 18:
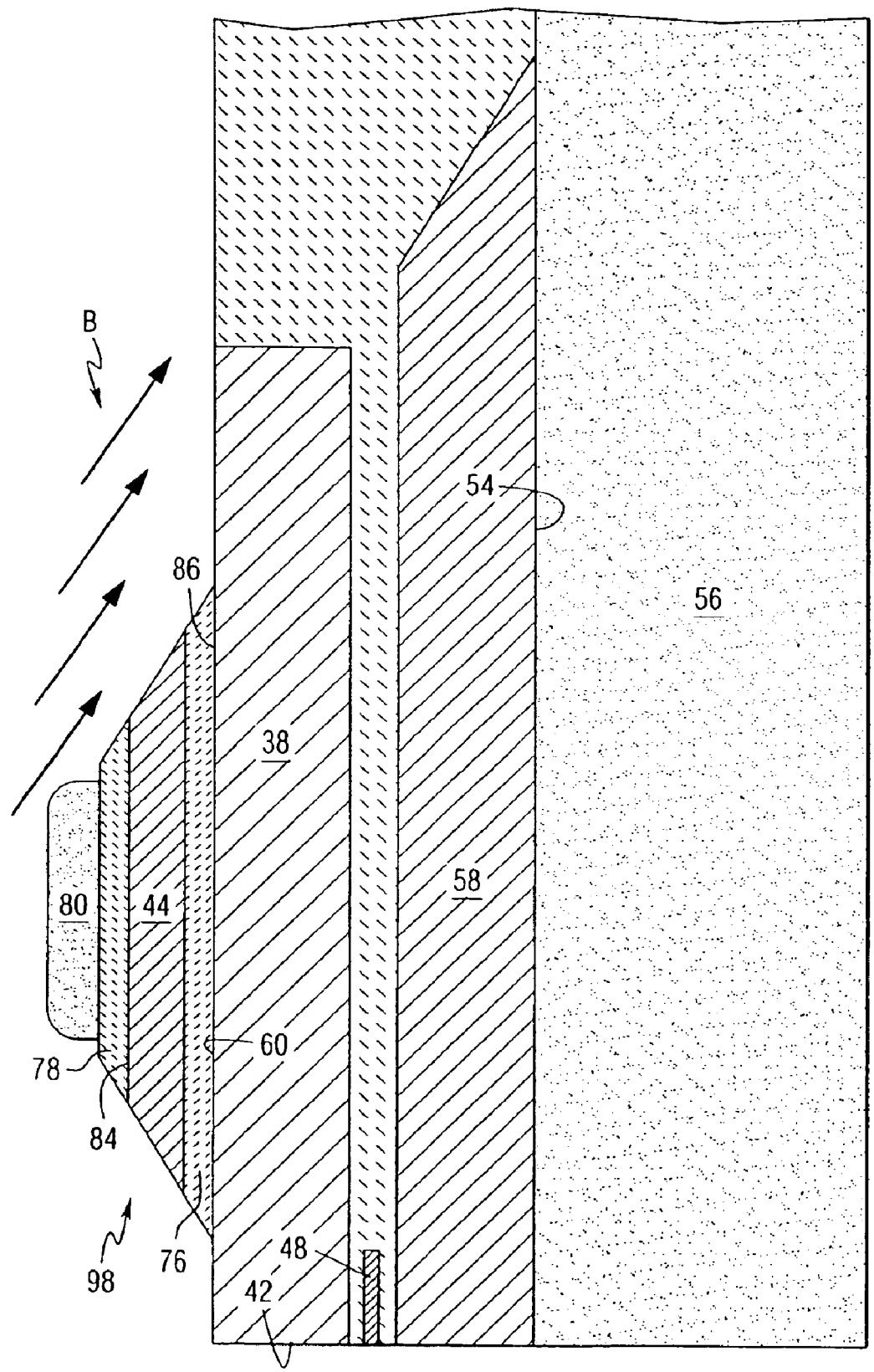
FIG. 18 is a cross-sectional side view of a substrate, shields, read element, coil, and insulation for an alternative recording head of the present invention, following removal of unnecessary coil and insulation material.
Figure 19:
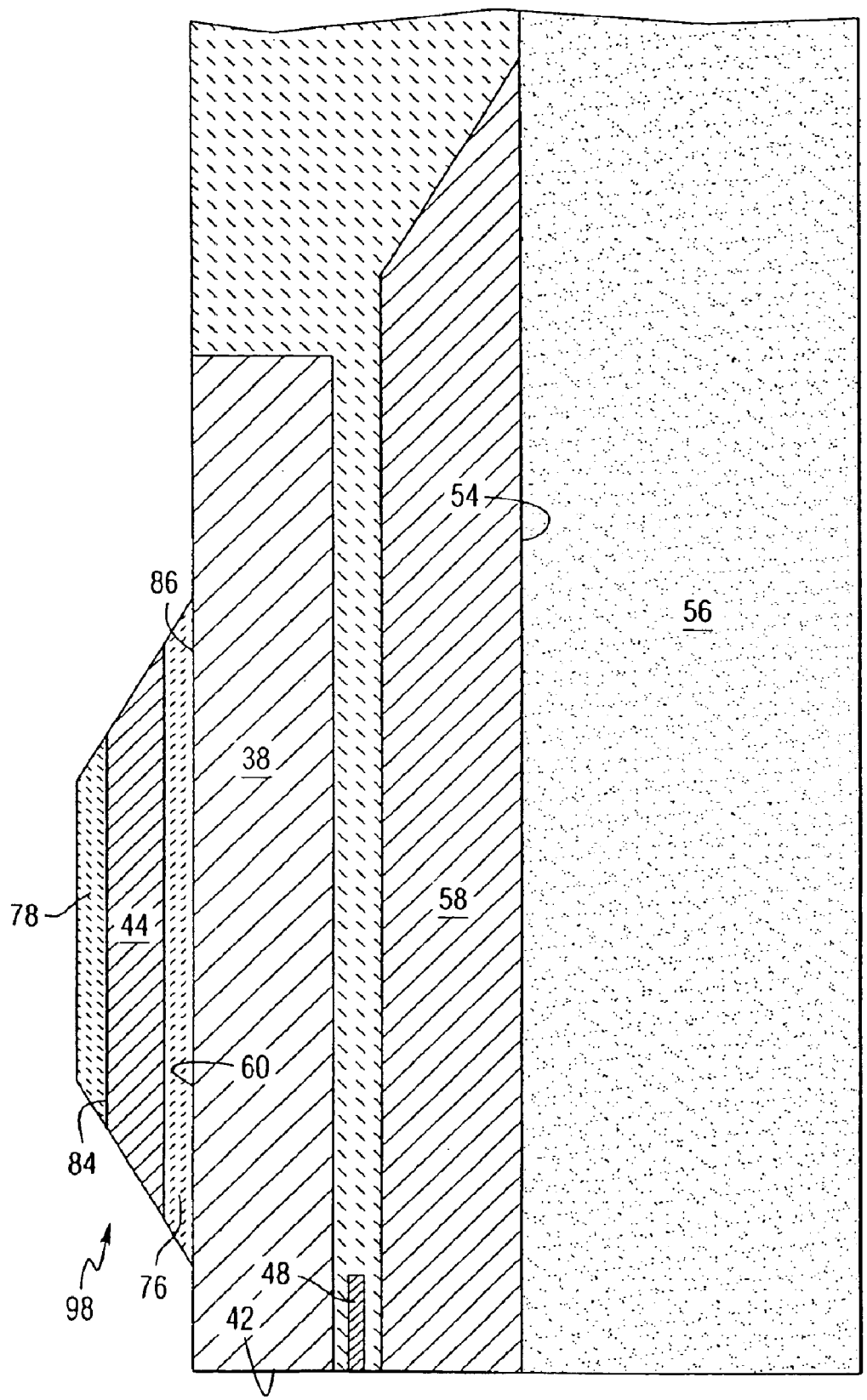
FIG. 19 is a cross-sectional side view of a substrate, shields, read element, coil, and insulation for an alternative recording head according to the present invention, after removal of the photoresist shielding.
Figure 20:
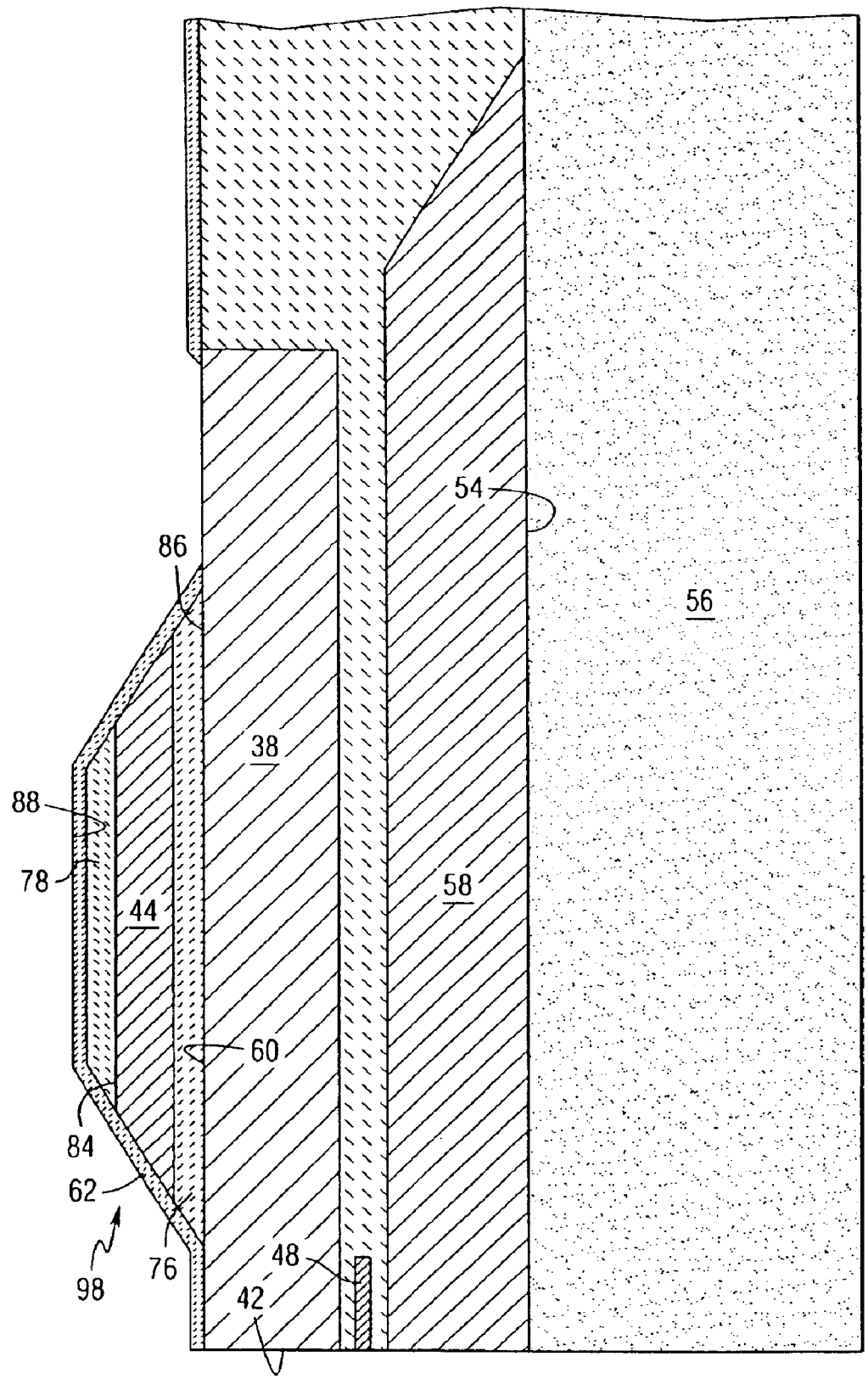
FIG. 20 is a cross-sectional side view of a substrate, shields, read element, coil, insulation, and write gap for an alternative recording head according to the present invention.

An alternative procedure for making a write pole of the present invention is illustrated in FIGS. 14–20. As before, the process begins by providing a substrate 56 having a read element 48 and its associated shields 38 and 58 secured to the substrate surface 54. The surface 60 is chemical-mechanical polished to ensure that it is flat. These components are illustrated in FIG. 15. Referring to FIG. 16, a first layer of insulation 76 (preferably alumina) is deposited on the surface 60, followed by the material forming the coil 44 (preferably copper), and a second layer of insulation 78. A photoresist shield 80 is then deposited over the second layer of insulation 78, thereby protecting those portions of the insulation layers 76 and 78 that will remain, and that portion of the coil 44 that will remain. The photoresist 80 has also thereby defined the excess material 82 to be removed in subsequent steps. This excess material 82 is removed as illustrated in FIG. 18. A preferred method of removing the excess material 82 is by ion milling, which may be performed at an angle. Preferably, the angle is selected so that the remaining coil and insulation assembly 98 is tapered, with the area of the surface 84, adjacent to the photoresist (and eventually the main pole 30) being smaller than the area of the surface 86 adjacent to the shield and opposing pole 38. The arrows B indicate a preferred direction for the milling process. Photoresist 80 may then be removed as illustrated in FIG. 19, and write gap 62 may be deposited as illustrated in FIG. 20. These deposition processes define a surface 88 on the write gap 62, with the surface 88 preferably having flat surface topology. Referring back to FIG. 14, the flat surface 88 permits the photoresist that will ultimately define the width of the write pole 30 to be spinned into place in a more controlled manner, thereby permitting a small write pole to be produced without compromising the pole's magnetic properties.

Referring back to FIG. 2, a magnetic storage medium 16, here a magnetic disc, for use with a perpendicular recording head 22 is illustrated. The disc 16 includes a recording layer 90 having a plurality of magnetically permeable tracks 92, which are divided into sectors. Each sector has several different magnetic fields within the magnetically permeable material (not shown and well understood). The tracks 92 are separated by nonmagnetized transitions 94. If perpendicular recording is desired, then the disc 16 also includes a magnetically permeable lower layer 96, which is magnetically soft relative to the tracks 92. In use, the disc 16 will be separated from the tip 32 of the main pole 30 by a flying height A. The flying height A is sufficiently small so that a high concentration of flux from the main pole 30 will pass through the track 92, but sufficiently large to prevent damage to disc 16 from contact with the recording head 22.

Recording is accomplished by rotating the disc 16 relative to the recording head 22 so that the recording head 22 is located above the appropriate sectors of the tracks 92. As recording progresses, the disc 16 will move past the recording head 22. Current will be supplied to the coil 44, thereby inducing a magnetic field within the main pole 30. As a portion of the sector of the track 92 passes under the main pole 30, the orientation of its magnetic field will correspond to the orientation of the magnetic field of the main pole 30 in the case of perpendicular recording, or the orientation of the magnetic field within the write gap in the case of longitudinal recording. As the main pole passes over the disc 16, the direction of current passing through the coil 44 will remain constant when a binary "0" is being recorded, thereby creating consistent orientation of the magnetic fields within the track 92. The current passing through the coil 44 will reverse directions when a binary "1" is being recorded, thereby changing the orientation of a magnetic field within the track 92.

The recording density possible with a perpendicular recording head is primarily dependent upon the main pole's width C. The width C required is determined by the precision with which the deposition or plating process used to deposit the write pole 30 can be accomplished. This precision is affected by the flatness of either surface 74 or surface 88, upon which the write pole 30 will be plated. It is well known in the art that a photoresist will be used to define the area upon which the main pole 30 will be plated or sputtered, and that this photoresist is applied by a spinning process with the photoresist in liquid form. The spinning process can be controlled more precisely if applied to a flat surface. Therefore, maximizing the flatness of the surface area 72 or 88 minimizes the area upon which the write pole 30 must be deposited to ensure that the proper magnetic properties are present, thereby minimizing the width C of the write pole and maximizing recording density.

Additionally, because all electrically insulating materials used within a recording head 22 of the present invention are inorganic, and preferably vacuum deposited, a thermally efficient, low stress structure results. The hard bake process is typically used to cure organic insulators are avoided, freeing the read sensor from degradation caused by these processes. Additionally, the hard bake process causes the components of the recording head 22 to expand and contract, resulting in thermal stresses and possibly cracks.

The present invention has the additional advantage of keeping the path for the magnetic field around the coil 44 as simple as possible. The distance from the bottom surface 34 to the top of the coil may be less than 2 microns.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of making a recording head for use with magnetic recording media, said method comprising the steps of:

providing a substrate, a read element, and a pair of shields on opposing sides of said read element;

depositing an inorganic insulating write gap layer on one of said pair of shields, creating a surface for deposition of a main pole;

depositing a first layer of photoresist on the surface, the first layer of photoresist having an opening;

vacuum depositing a coil conductor on the surface through the opening;

removing the first layer of photoresist;

depositing a second layer of photoresist having an opening around the coil conductor, wherein the opening is larger than the coil conductor;

depositing insulation through the opening in the second layer of photoresist; and depositing the main pole on said insulation and a portion of said write gap layer.

2. The method of claim 1, further comprising the step of removing said second layer of photoresist prior to the step of depositing the main pole on said insulation and a portion of said write gap layer.

3. A method of making a recording head for use with magnetic recording media, said method comprising the steps of:

providing a substrate, a read element, and a pair of shields on opposing sides of said read element;

depositing an inorganic insulating write gap layer on one of said pair of shields, creating a surface for deposition of a main pole;

depositing a first layer of photoresist on the surface, the first layer of photoresist having an opening;

vacuum depositing a coil conductor on the surface through the opening;

removing the first layer of photoresist;

depositing insulation on the coil conductor; and depositing the main pole on said insulation and a portion of said write gap layer;

wherein the coil conductor forms a single turn coil.

* * * * *